(12) United States Patent
Bysveen et al.

(10) Patent No.: US 7,614,385 B2
(45) Date of Patent: Nov. 10, 2009

(54) GAS ENGINE

(75) Inventors: Marie Bysveen, The Department of Marine Technology, Norweigian University of Science and Technology, Trondheim (NO) N-7491; Terje Almås, The Department of Marine Technology, Norweigian University of Science and Technology, Trondheim (NO) N-7491; Robert Jørgensen, Stavanger (NO); Frode Kvinge, Stavanger (NO)

(73) Assignees: Statoil ASA, Stavanger (NO); Marie Bysveen, Trondheim (NO); Terje Almas, Trondheim (NO)

( * ) Notice: Subject to any disclaimer, the term of this patent is extended or adjusted under 35 U.S.C. 154(b) by 0 days.

(21) Appl. No.: 11/579,807

(22) PCT Filed: May 9, 2005

(86) PCT No.: PCT/GB2005/001721

§ 371 (c)(1),
(2), (4) Date: Mar. 8, 2007

(87) PCT Pub. No.: WO2005/108770

PCT Pub. Date: Nov. 17, 2005

(65) Prior Publication Data

US 2008/0022965 A1    Jan. 31, 2008

(30) Foreign Application Priority Data

May 7, 2004   (GB)   .................................. 0410259.6

(51) Int. Cl.
*F02M 69/46* (2006.01)
*F02M 69/50* (2006.01)

(52) U.S. Cl. ..................................................... 123/456
(58) Field of Classification Search ................. 123/525, 123/527, 575, 456, 447, 304, 295, 27 GE, 123/299
See application file for complete search history.

(56) References Cited

U.S. PATENT DOCUMENTS

| | | | | |
|---|---|---|---|---|
| 2,767,691 A | * | 10/1956 | Mengelkamp et al. | 123/1 R |
| 2,968,298 A | * | 1/1961 | Meuer | 123/445 |
| 4,637,353 A | * | 1/1987 | Codrington | 123/27 GE |
| 4,641,625 A | | 2/1987 | Smith | |
| 4,817,568 A | * | 4/1989 | Bedford | 123/431 |
| 4,831,993 A | * | 5/1989 | Kelgard | 123/525 |

(Continued)

FOREIGN PATENT DOCUMENTS

EP   0 801 223 A   10/1997

(Continued)

OTHER PUBLICATIONS

International Search Report for PCT/GB2005/001721 mailed Mar. 1, 2006.

(Continued)

*Primary Examiner*—Mahmoud Gimie
(74) *Attorney, Agent, or Firm*—Nixon & Vanderhye P.C.

(57) ABSTRACT

A compression ignition internal combustion engine which operates using a methane based fuel and an ignition initiator. The fuel and method of operating the engine can be employed in a range of applications such as, for example, road or marine vehicles or in static applications such as electrical generators.

25 Claims, 3 Drawing Sheets

U.S. PATENT DOCUMENTS

| | | | |
|---|---|---|---|
| 5,067,467 A * | 11/1991 | Hill et al. | 123/497 |
| 5,097,803 A * | 3/1992 | Galvin | 123/3 |
| 5,163,397 A * | 11/1992 | Pien | 123/299 |
| 5,170,727 A | 12/1992 | Nielsen | |
| 5,315,973 A * | 5/1994 | Hill et al. | 123/304 |
| 5,666,926 A | 9/1997 | Ferrera et al. | |
| 6,095,101 A | 8/2000 | Pedersen | |
| 6,102,975 A | 8/2000 | Marr | |
| 6,119,664 A | 9/2000 | McCandless | |
| 6,205,957 B1 | 3/2001 | Saylor | |
| 6,340,003 B1 | 1/2002 | Schoubye et al. | |
| 6,427,660 B1 | 8/2002 | Yang | |
| 6,439,192 B1 * | 8/2002 | Ouellette et al. | 123/299 |
| 6,484,699 B2 * | 11/2002 | Paul et al. | 123/525 |
| 2002/0002967 A1 * | 1/2002 | Paul et al. | 123/525 |
| 2002/0062822 A1 | 5/2002 | Watanabe et al. | |
| 2002/0195088 A1 * | 12/2002 | Oprea | 123/525 |

FOREIGN PATENT DOCUMENTS

| | | |
|---|---|---|
| EP | 0 801 223 A1 | 10/1997 |
| EP | 0 903 395 A1 | 3/1999 |
| EP | 0 957 152 A1 | 11/1999 |
| EP | 1 211 407 A | 6/2002 |
| EP | 1 211 407 A2 | 6/2002 |
| EP | 1 243 776 A | 9/2002 |
| EP | 1 243 776 A1 | 9/2002 |
| GB | 2 143 846 A | 2/1985 |
| JP | 62500674 | 3/1987 |
| JP | 5-302701 | 11/1993 |
| JP | 8158980 A | 6/1996 |
| JP | 10220301 A | 8/1998 |
| JP | 2000511990 | 9/2000 |
| JP | 2002155809 A | 5/2002 |
| JP | 2002-161822 | 6/2002 |
| JP | 2003314316 A | 11/2003 |
| SU | 1370290 | 1/1988 |
| WO | WO 95/05437 | 2/1995 |
| WO | 97/47867 | 12/1997 |
| WO | 02/101213 A | 12/2002 |
| WO | WO 02/101213 A1 | 12/2002 |

OTHER PUBLICATIONS

English translation of Japanese Office Action dated Nov. 21, 2008 (7 pages).

Mamedov M.D. et al., "Gas based vehicle engines", Moscow, 1994, 8 pages including 1 page of English translation.

Official Action of Co-Pending Russian Application No. 2006139932/06 (043546) with English Translation, mailed Dec. 8, 2008, 9 pages.

English Translation of Chinese Office Action issued in corresponding Chinese Application No. 2005800181326, dated Mar. 28, 2008, 10 pages.

Office Action (and Eglish translation) issued in corresponding Japanese Application No. 2007-512320, mailed Jun. 30, 2009 (8 pages).

* cited by examiner

GAS ENGINE

This application is the US national phase of international application PCT/GB2005/001721, filed 9 May 2005, which designated the U.S. and claims priority of GB 0410259.6, filed 7 May 2004, the entire contents of each of which are hereby incorporated by reference.

The present invention relates to diesel cycle engines and in particular to diesel cycle engines operating using gaseous fuels.

The demand for diesel-cycle engines has grown substantially in recent times, particularly in the area of automobiles for personal use. The diesel cycle engine provides improved fuel consumption which reduces the fuel cost of motoring.

However, the increased use of diesel engines greatly adds to the atmospheric presence of pollutants such as oxides of nitrogen and particulate matter. Diesel cycle engines, although giving better fuel economy, emit higher levels of nitrogen oxide (NOx) and particulates than equivalent petrol or gasoline engines. Environmental regulations such as the European Union's existing EURO-4 regulation define acceptable emissions from automotive engines. The proposed EURO-5 regulation will impose strict levels of particulate emissions from diesel engines in the future.

One method of improving the efficiency and lowering the emissions of diesel engines i.e. the reduction of NOx and particulate emissions, is to replace the diesel fuel with a gaseous fuel such as, for example, propane ($C_3H_8$), methane ($CH_4$) or natural gas (of which methane is the main component). By gas fuels we mean fuels which are gas at standard temperature and pressure. They may be liquefied for storage and/or when supplied to the engine.

Methane has a simple chemical structure, each molecule having one atom of carbon surrounded by four atoms of hydrogen. In contrast, conventional fuels such as diesel and gasoline have more complex chemical compositions comprising mixtures of longer chains of hydrocarbons. Conventional fuels also contain higher proportions of carbon, sulphur and nitrogen and do not burn as cleanly as gas fuels. Methane does not generate high levels of emissions or particulates when it is used as a fuel.

Besides burning more cleanly, gaseous fuels such as methane also have the advantage of having relatively large reserves which are more evenly distributed across the planet than oil reserves.

Diesel-cycle engines which have been modified to run on gas fuel have been used for a number of years. However, substantial modifications are necessary to adapt a diesel-cycle engine to operate using a gas fuel.

The main reason that diesel-cycle engines require modification is because of the way the fuel is ignited and burned within the engine. In a conventional diesel engine, the diesel fuel self-ignites when it is injected into a cylinder where air has been compressed to a specific pressure and temperature. This is typically at a temperature and pressure higher than 500° C. and 45 bar. However, gases such as methane and propane require far higher temperatures and pressures than these to ensure stable self-ignition.

In order to use gaseous fuels in vehicles that normally run on diesel, for example city buses, it is possible to convert diesel engines to spark-ignition engines by installing spark plugs and ignition systems and reducing the compression ratio to approximately 15:1. A reduction in the compression ratio is necessary to avoid engine knock. However, the result of this conversion is a conventional gasoline-type engine and so the efficiency advantages associated with a diesel-cycle engine are lost.

Another method of modifying a diesel engine to operate using a gaseous fuel is to convert the engine to pilot injection. In a typical pilot fuel engine, air is compressed and gas is injected into the compressed air through an injector at the end of the compression stroke. A second injector introduces a pilot fuel into the combustion chamber. The pressure and temperature within the chamber is sufficient to ensure self-ignition of the pilot fuel which in turn ignites the gas/air mixture.

The combustion process in this type of engine is essentially a multi-stage process which requires mixing of air and fuel inside or outside of the cylinder, compression, injection of a pilot fuel, ignition of the fuel and then combustion.

Diesel engines of this type require two separate injectors (one for the gas and one for the pilot fuel) in combination with a complex injection system. Furthermore, the auxiliary equipment required around the engine to supply two fuels to each injector makes the engine substantially more complicated and expensive than a conventional diesel engine.

There is, therefore, a need for a diesel-cycle engine which is capable of operating using a gaseous fuel but which does not require a complicated or large injection or ignition system. Furthermore, there is a need for a diesel-cycle engine which will be able to operate so as to meet the forthcoming particulate emissions targets.

WO 01/83646 for example discloses a liquefied gas fuel for use in a compression ignition engine which aims to reduce emissions using an liquefied petroleum gas fuel (LPG). Although these fuels provide some benefits in terms of emissions they do not benefit from the advantages which can be achieved using other gaseous fuels.

Viewed from a first aspect, the present invention provides a compression ignition engine arranged to operate using a mixture of a methane based gas and an ignition initiator, wherein the mixture is injected into a combustion chamber of the engine.

Preferably, the compression ignition engine is a diesel-cycle engine.

The term "methane based gas" as used herein is intended to refer to a substance that is gaseous at standard temperature and pressure and which comprises a large proportion of methane. A large proportion of methane is intended to refer to a content of methane generally in excess of 70%, more preferably in excess of 80% and most preferably in excess of 90% methane. Still more preferably the methane based gas is natural gas which is a particularly convenient fuel for reasons discussed above.

For gases with a high proportion of methane it may not practical to liquefy the gas and so the gas may be supplied to the engine under pressure in a supercritical state.

The methane based gas and ignition initiator may be supplied to the engine as a single pre-mixed fuel containing a proportion of liquefied or highly pressurized gas and a proportion of ignition initiator. The ignition initiator may be suspended as a "mist" within the gas.

The gas may be any suitable hydrocarbon gas containing methane. The gas may also contain other gases such as ethane, propane, butane or any mixture thereof. Also, gas mixtures containing a mixture of other gases are suitable.

The ignition initiator component (which may be an ignition improver) of the fuel enables the mixture to ignite in the combustion chamber as a result of the temperature and pressure in the cylinder, as in a conventional diesel engine. By means of the invention, the problem of the prior art pilot-fuel engines are overcome. Only a single injector per cylinder is needed and combustion is more effective. The present invention enables easy conversion of older diesel engines in busses and lorries to operate using liquid and gaseous natural gas fuels.

A wide variety of substances that will ignite in the combustion chamber may be used as the ignition initiator, for example, it may be conventional diesel fuel. It is preferably selected to generate free-radicals at the elevated temperatures within the combustion chamber of the engine which accelerates oxidation of the fuel and initiates combustion.

The ignition initiator preferably comprises a cetane improver which acts to increase the cetane number of the fuel. The cetane number of a fuel is a well-known indication of the time delay between injection of the fuel into the combustion chamber and ignition of the fuel. A higher cetane number indicates a shorter time delay between injection and ignition which is desirable in a diesel-cycle engine. It is usual for conventional diesel fuel to contain cetane improver.

Cetane numbers and the calculation thereof are described in '*Automotive Fuels Reference Book-Second Edition*', published by the Society of Automotive Engineers, Inc. and '*Fuel Field Manual—Sources and Solutions to Performance Problems*', published by McGraw-Hill.

The type and proportion of cetane improver in the ignition initiator is preferably selected to increase the cetane number of the ignition initiator to over 60 and more preferably over 70. However, there is no advantage in a cetane number of over 80. Thus, most preferably, the cetane number of the fuel is between 70 and 80.

It will be appreciated that the ratio of cetane improver to gas required to achieve a desired cetane number will depend on the particular cetane improver and gas selected.

The ignition initiator may be a pure cetane improver or alternatively it may comprise a carrier liquid into which a cetane improver is mixed, as in the case of the diesel fuel mentioned above. Preferably, the cetane improver is miscible in the carrier.

The use of a carrier facilitates metering of the ignition initiator which may be required within the engine so as to mix the correct proportion of ignition initiator with the gas.

The carrier liquid and cetane improver can preferably be delivered to the engine using conventional diesel engine fuel pumps.

The carrier liquid may for example be GTL (Gas to Liquid—a synthetic fuel with a high cetane number), DME (dimethylether), FAME (Fatty Acid Methyl Esters e.g. RME), kerosene or gasoline. Preferably, the carrier liquid is conventional diesel fuel. Thus, the diesel may contain the conventional amount of cetane improver, or an increased amount to provide the preferred cetane number above.

The ignition initiator may be any mixture of alkanes and alkenes. The ignition initiator may be one or more such compounds containing between 5 and 25 carbon atoms and a molecular weight between 70 and 350 atomic mass units. The ignition initiator may alternatively be a mono-ether or di-ether having a molecular weight between 40 and 350 atomic mass units.

The ignition initiator may further have a density (at 15° C.) between 600 and 845 kg/m$^3$, a boiling point between −30° C. and 360° C. and a cetane number of between 50 and 80.

The ignition initiator may for example be DME (dimethylether) or GTL (Gas To Liquid—a synthetic fuel with a high cetane number) with the following (approximate) properties:

| | DME | GTL |
|---|---|---|
| Density (kg/m$^3$ @ 15° C.) | 670 | 770-778 |
| Boiling Point ° C. | −24.6 | 170 (initial boiling point) |
| Cetane Number | >55 | >74 |
| Molecular Weight (atomic mass units) | 46.07 | between 70 and 350 |
| Sulphur content | | <1 ppm |
| Viscosity (@ 40° C.) | | 2.10 cSt |
| Aromatics content | | <1 wt % |

Cetane improvers which may be used include alkyl and/or aryl-nitrates such as amyl nitrate, isopropyl nitrate, hexyl nitrate, cyclohexyl nitrate, 2-ethylhexyl nitrate and octyl nitrate. It will be appreciated that other suitable cetane improvers may also be employed in the present invention.

Other additives may also be added to the fuel. For example, to improve the lubrication properties of the fuel and to clean the engine.

Preferably, further additives are selected so as to minimize any increase in NO$_x$ or particulate emissions during combustion. In addition, further additives are also preferably selected so as to be miscible with pressurized or liquefied gas and conventional diesel fuel.

In the case where a methane based gas is used in combination with a diesel fuel as the ignition initiator, the fuel is preferably supplied (and more preferably also stored) at an elevated pressure to improve the solubility of the diesel in the gas and to prevent the separation of gas and ignition initiator. Preferably the gas is supplied at a pressure of or above 500 bar. More preferably the gas is supplied at a pressure of or above 600 bar. The gas is preferably supplied and more preferably also stored at a temperature between 0 and 100 deg C.

At these pressures it has been established that conventional diesel fuel is conveniently miscible in the gas so as to provide a uniform fuel for injection into the engine.

The fuel may further be provided with combustion improvers such as, for example, organometallic compounds (e.g. organometallic compounds comprising barium, calcium, magnesium, cerium and iron).

Viewed from a second aspect, an invention disclosed herein provides a method of operating a compression ignition engine using a gas based fuel wherein a gas comprising methane is mixed with an ignition initiator and supplied to the combustion chamber of a compression ignition engine.

The method preferably uses the preferred ignition initiator and/or additives discussed above.

Viewed from yet another aspect, an invention disclosed herein provides a fuel suitable for supplying to the combustion chamber of a compression ignition engine, wherein the fuel contains a mixture of methane based gas and an ignition initiator.

The method preferably uses the preferred ignition initiator and/or additives discussed above.

Viewed from a still further aspect, an invention disclosed herein provides a method of making a liquefied or pressurized gas based fuel suitable for use in a compression ignition engine, comprising the steps of:
(a) liquefying or pressurizing a hydrocarbon gas containing methane; and
(b) mixing a proportion of an ignition initiator into said liquefied or pressurized hydrocarbon gas.

In the case where a gas is used with a high proportion of methane, the gas may be in a supercritical state when it is mixed with the ignition initiator.

The fuel may be pre-mixed in bulk and e.g. stored in a single fuel tank or vessel fluidly connected to the engine. When the gas is liquefied, the tank or vessel would be pressurized to a pressure above the liquefication pressure of the gas in order to prevent the ignition initiator and gas separating before injection into the combustion chamber.

Alternatively, the gas and ignition initiator may be stored in separate tanks and 5 mixed or blended before being supplied to the engine. Preferably, with this arrangement the gas and ignition initiator are mixed immediately before being introduced into the combustion chamber of the engine. Most preferably the ignition initiator is mixed with the gas within the fuel injector.

Thus, viewed from a still further aspect, an invention disclosed herein provides a fuel injector assembly for a compression ignition engine wherein the fuel injector is arranged to be provided with a first fuel component in the form of a liquefied or pressurized gas and a second fuel component in the form of an ignition initiator wherein said first and second fuel components are mixed together in the injector assembly before being injected into a combustion chamber of said engine.

The gas fuel may be methane-based, as discussed above, but it can also be propane, LPG or other known fuel gases.

The term 'injector assembly' may refer to the fuel injector itself, to the associated components and also to any associated mixing apparatus arranged to mix and then deliver the fuel to the fuel injector.

It will be appreciated that the two fuel components can be conveniently mixed in any part of the injection system and not only in the injector itself. For example, the fuel may be blended in a separate fuel mixing unit or apparatus or in a conduit forming part of the fuel delivery system.

Mixing may take place anywhere in the fuel delivery system and can be near the fuel injector but it is preferably mixed immediately before injection into the combustion chamber. This prevents the fuel components separating and thereby provides a uniform fuel to the combustion chamber. This is particularly advantageous when the fuel is pressurized but not liquefied, e.g. when methane is used. However, this is equally applicable to other fuels mentioned above such as propane or LPG.

Most preferably, in the arrangement where two tanks or vessels are used, the proportions of gas and ignition initiator may be varied. For example, the tanks or vessels may comprise controllable valves arranged to adjust the proportion of ignition initiator mixed with the gas in response to operating conditions of the engine.

The ratio of ignition initiator to gas may be adjusted in response to engine operating conditions such as, for example, engine air inlet temperature, engine emission levels, engine load or fuel consumption. It will be appreciated that the proportion of ignition initiator required may depend on a variety of engine operating conditions.

Where pre-mixed fuel is used, the fuel may be introduced into the combustion chamber, or chambers, using a conventional fuel delivery system. For example, each combustion chamber may be provided with a fuel injector having a single fuel supply for use with pre-mixed fuel.

Where the fuel is mixed in the fuel injector assembly, each combustion chamber injector may be provided with a first supply of liquefied or pressurized gas and second supply of ignition initiator and may further be arranged to mix the gas and ignition initiator before injection into the chamber.

Preferably, the fuel is introduced into the combustion chamber(s) using a common rail fuel delivery system in combination with fuel injectors.

The fuel may be delivered into the common rail as a pre-mixed fuel or, alternatively, the components of the fuel may be mixed in and/or along the common rail.

For example, the common rail may be provided with one or more ignition initiator inlets along the length of the common rail and a liquefied (or pressurized) gas inlet at the end of the rail. It will be appreciated that a number of alternative arrangements of ignition initiator and gas inlets could be used with the common rail fuel delivery system.

Viewed from yet another aspect, an invention disclosed herein provides a fuel delivery system for a compression ignition engine wherein a liquefied or pressurized methane based gas comprising an ignition initiator is supplied to the engine using a common fuel rail.

Viewed from yet another aspect, an invention disclosed herein provides a fuel injector assembly comprising a fuel injector and a separate fuel mixing unit wherein the mixing unit receives a first fuel component in the form of a liquefied or pressurized gas and a second fuel component in the form of an ignition initiator and wherein the mixing unit mixes the first and second fuel components and supplies the mixed fuel to the injector.

Embodiments of the present invention will now be described, by way of example only, with reference to the accompanying drawings in which:

FIG. 1 shows a diesel-cycle engine 1 arranged to operate according to a first embodiment of the present invention. This arrangement corresponds closely to a conventional fuel delivery arrangement in a diesel engine.

Figure 1:
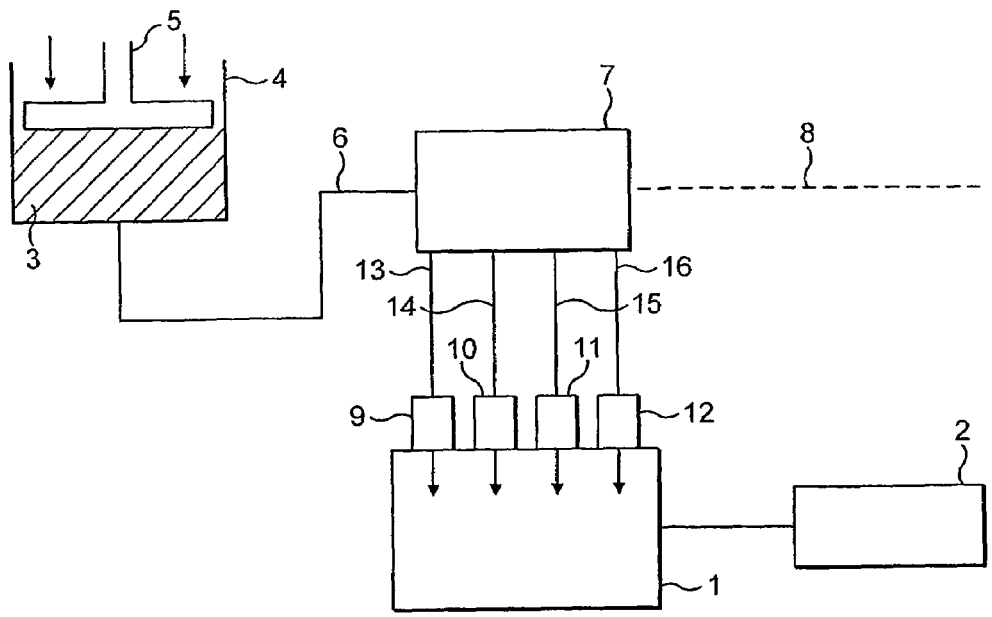
FIG. 1 shows a first embodiment of the invention having a single fuel source.

In FIG. 1, the diesel-cycle engine 1 is arranged to drive load 2 which may for example be the gear box of a car or an electricity generating set.

A fuel that is gas at standard temperature and pressure is stored under pressure in storage vessel 4 under the action of plunger 5. The vessel is fluidly connected, via conduit 6, to fuel pump 7. Fuel pump 7 receives control signals on control line 8 and is fluidly connected to fuel injectors 9, 10, 11, 12 via conduits 13, 14, 15, 16. Fuel injectors 9, 10, 11 and 12 individually inject fuel into respective combustion chambers (not shown) inside engine 1. Engine 1 is connected via a coupling (coupling not shown) to engine load 2.

Gas fuel is pressurized or liquefied and mixed with an ignition initiator in a fuel mixing facility (not shown). The pre-mixed fuel 3 is fed into fuel storage vessel 4 which maintains the fuel in a pressurized or liquid state using an over pressure generated by plunger 5.

Fuel is pumped from the fuel storage vessel 4 along fuel line 6 to the engine by fuel pump 7. Fuel pump 7 is controlled in response to control signals from the engine operator via control line 8 to deliver fuel to the engine. Each cylinder of the engine has an injector 9, 10, 11, 12 which receives fuel from the fuel pump 7 via fuel lines 13, 14, 15, 16 respectively.

In this embodiment the fuel is held in a single storage tank and supplied to the engine injectors from the single pre-mixed source 4. The diesel-cycle engine works in a conventional manner with fuel being injected into the combustion chamber in the conventional way. The pre-mixed fuel ignites when injected into the combustion chamber. The ignition initiator which is mixed into the gas fuel generates free-radicals at the elevated temperatures within the combustion chamber which accelerate oxidation of the fuel and thereby initiate combustion of the air/gas mixture.

Figure 2:
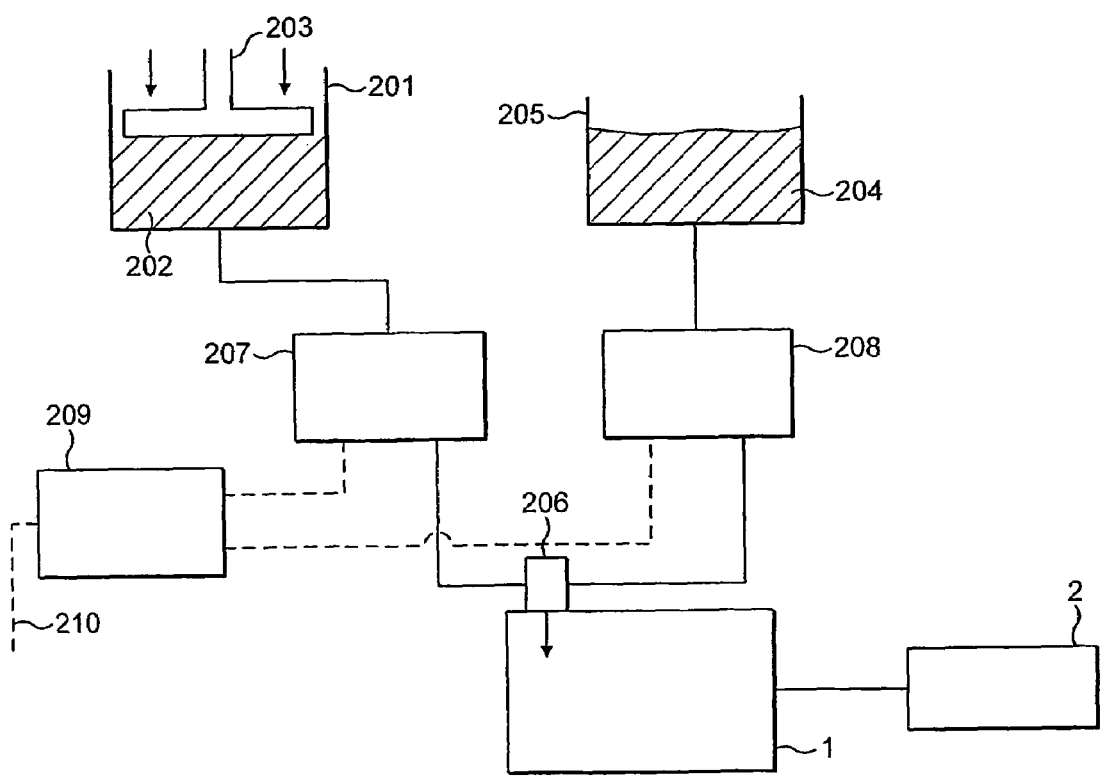
FIG. 2 shows a preferred embodiment of the invention having separate fuel component sources.

FIG. 2 shows the preferred embodiment of the present invention wherein the two fuel components are stored separately.

Pressurized gas is stored in vessel 201 which is fluidly connected to fuel pump 207. Fuel pump 207 receives control signals from controller 209 and is itself fluidly connected to fuel injector 206. Ignition initiator 204 is stored in tank 205 which is fluidly connected to pump 208 which receives control signals from controller 209. Pump 208 is also fluidly connected to injector 206. Injector 206 is arranged to inject fuel into a combustion chamber (not shown) of engine 1.

Vessel 201 maintains the gas 202 in a pressurized or liquid form using plunger 203. The ignition initiator 204 is contained in tank 205. If the ignition initiator is a liquid at standard temperature and pressure the tank 205 need not be a pressurized vessel.

However, if the ignition initiator is gaseous at standard temperature and pressure the ignition initiator is stored in a pressurized vessel 205.

The gas and ignition initiator are supplied to the engine injector 206 (only one injector is shown) via pumps 207 and 208 respectively which receive control signals from fuel control unit 209.

The control unit 209 receives user control signals on control line 210 as well as indications of the operating conditions of the engine. The control unit 209 controls the ratio of gas to ignition initiator depending on the operation and demand of the engine. For example, in cold conditions, or when the engine has just started, a higher percentage of ignition initiator may be required to achieve the desired engine output. When the engine has warmed up the control unit 209 can control pump 208 to reduce the proportion of ignition initiator being supplied to the injector 206.

In this embodiment the injector 206 is arranged to receive the two fuel components and to introduce them simultaneously into the combustion chamber. The two components are mixed in the injector immediately before injection into combustion chamber thereby ensuring a uniform dispersion of ignition initiator in the pressurized or liquefied gas.

Figure 3A:
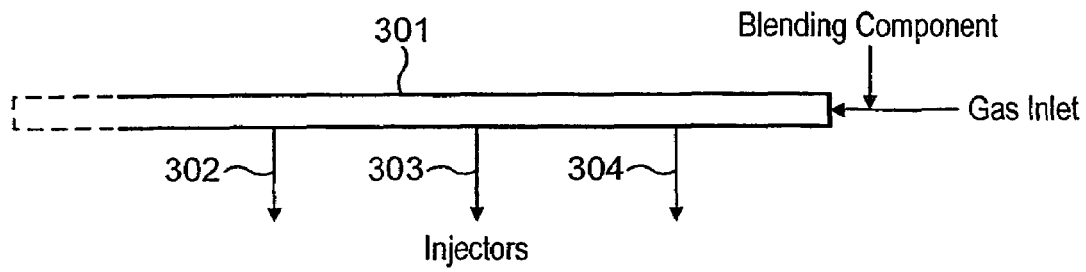
FIGS. 3A and 3B show arrangements of the common rail fuel delivery system according to an embodiment of the invention.
Figure 3B:
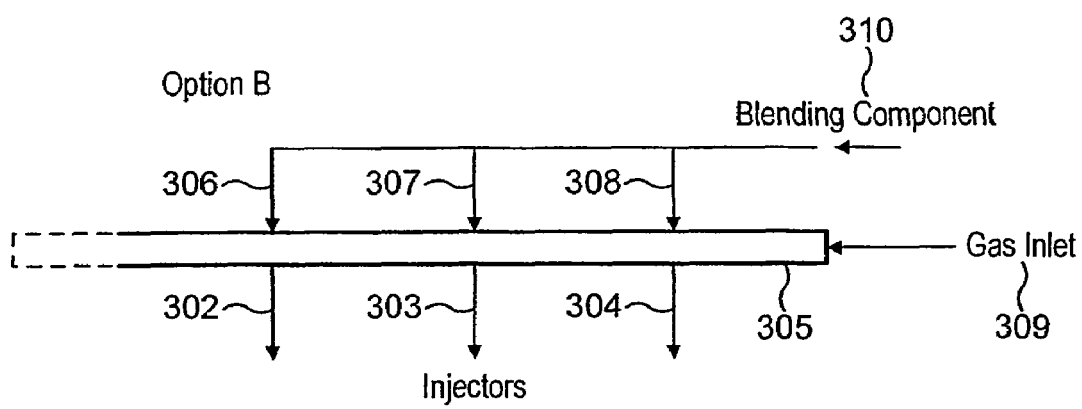

FIGS. 3A and 3B show the preferred embodiment of the fuel injection system.

FIG. 3A shows a common rail fuel delivery system which can be used in place of the fuel supply lines connecting the injectors to the fuel pumps as shown in FIGS. 1 and 2.

A common rail fuel delivery system replaces conventional fuel pumps which have a fuel output for each combustion chamber. In a common rail fuel delivery system the fuel pump supplies fuel at high pressure into a single pipe or rail. Each of the engine injectors is fluidly connected to the common high pressure supply or rail rather than individually directly to the fuel pump.

The common rail 301 shown in FIG. 3A has connections 302, 303, 304 which communicate fuel from the common rail 301 to each of the individual engine injectors (not shown). Fuel is supplied at pressure into the common rail such that the entire rail is at a common pressure e.g. 450 bar. FIG. 3A shows that the components of the fuel (the pressurized or liquefied gas and ignition initiator) are mixed together before being supplied to the common rail by a common rail fuel pump (not shown). In this arrangement the fuel may be supplied from a common pre-mixed source as shown in FIG. 1 or, alternatively, the two components may be mixed together immediately before being supplied to the common rail 301. In operation the mixed fuel is released into each of the combustion chambers via connections 302-304 which are fluidly connected to the individual injectors.

FIG. 3B shows a different embodiment of the common rail in which the pressurized or liquefied gas is introduced into the end of the rail 305. The ignition initiator is introduced into the rail at inlets 306, 307, 308 arranged along the length of the rail. In this embodiment the ignition initiator and pressurized or liquefied gas mix in the rail itself before being introduced into the combustion chambers.

The embodiment shown in FIG. 3A lends itself to the arrangement shown in FIG. 1 where a pre-mixed fuel is used which can be supplied from pump 7 to the injectors via a common rail. Similarly, the embodiment shown in FIG. 3B lends itself to the use of separate fuel components as shown in FIG. 2 where the gas vessel 201 can be connected to the common rail at 309 and the ignition initiator tank 205 can be connected to the rail at 310.

The use of a common rail system as shown in FIGS. 3A and 3B is particularly beneficial in the present invention where the fuel must be maintained at an elevated pressure.

Figure 4:
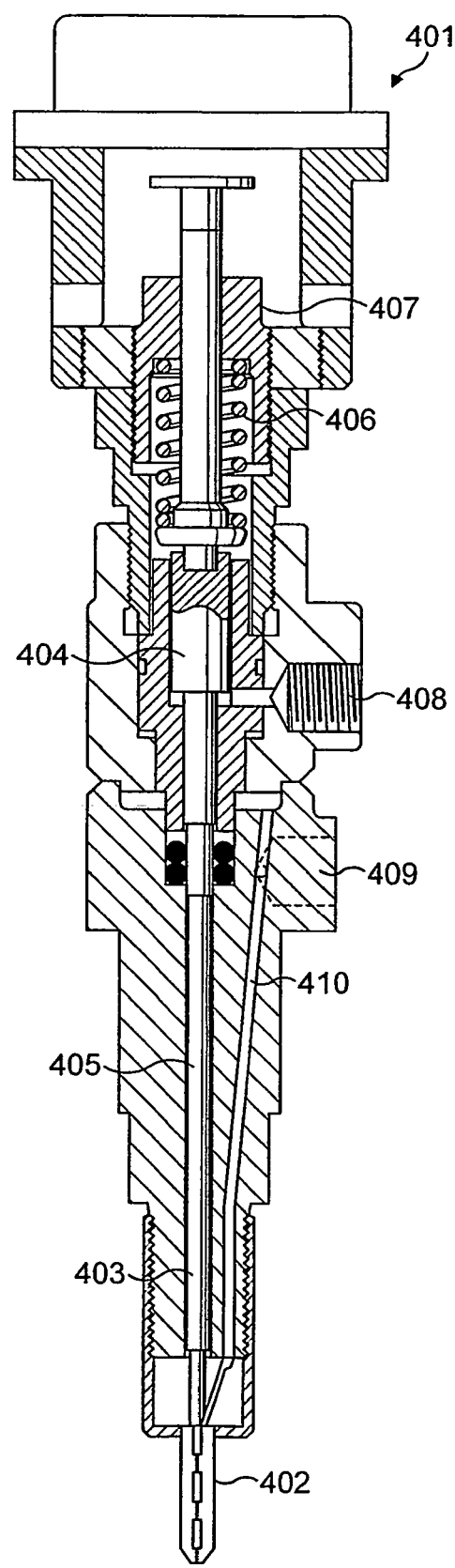
FIG. 4 shows a hydraulic injector suitable for injecting the gas fuel disclosed herein into a combustion chamber.

FIG. 4 shows a hydraulic injector suitable for injecting a gas fuel into a combustion chamber in the embodiments discussed above. It will be appreciated that the injector shown in FIG. 4 is suitable for injecting pressurized gas or liquefied gas into a combustion chamber.

The hydraulic injector 401 is mounted within the engine block in a conventional manner as is well known in the art.

The tip 402 of the hydraulic injector 401 is disposed within the combustion chamber of the engine and is arranged to release a quantity of fuel directly into the combustion chamber.

A injector needle 403 is arranged to seal an orifice at the tip of the injector. The needle is mechanically coupled to injector piston by a rod 405. The piston 404, rod 405 and needle 402 are biased towards the tip by a spring 406 acting against a retaining nut 407. The spring acts against the piston 404 so as to bias the needle towards and into the channel at the tip of the needle thereby sealing the tip and preventing liquid or gas flow into or out of the injector.

The injector is provided with a controllable servo valve (not shown) which receives control signals from the engine control unit (ECU). The servo valve supplies a high pressure oil 'pulse' or signal to connection 408 shown in FIG. 4 on receipt of an 'inject' control signal from the ECU.

As shown in FIG. 4, the connection 408 fluidly communicates with a chamber disposed at the bottom of the injector piston 404. In operation a pulse is supplied to the connection in response to a control signal from the engine control unit. The pulse acts to move the piston against the bias of the injector spring 406 and thereby lifts the rod 405 and needle 402 to provide a channel through which fuel can flow into the combustion chamber.

Fuel is supplied to the injector 401 from a pressurized tank as shown in FIG. 1. The supply may be fed directly from a fuel pump as shown in FIG. 1 or may, alternatively, be supplied from a common rail as shown in FIGS. 3A and 3B.

The pressurized or liquid fuel is supplied to the injector through fuel inlet port 409. Inlet port 409 is connected to the tip of the injector via a channel 410 which provides pressurized or liquid fuel to the injector tip and needle.

The pressure required to open the injector can be controlled by adjustment of the retaining nut 407 which acts to compress the injector spring 406.

The injector spring acts to hold the injector in a normally closed position which prevents fuel from being released into the chamber and prevents exhaust gases from combustion from entering the injector.

In operation, a control signal issues from the engine control unit (not shown) to the servo valve. The servo valve increases the pressure in the chamber below the injector piston to lift the piston against the bias of the injector spring. The needle is lifted by the movement of the piston and a stream or 'jet' of fuel is released into the combustion chamber. The servo valve is then controlled to remove the pressure from the piston and the spring acts to close the needle. This sequence is repeated for each combustion cycle of the engine.

The use of a hydraulic injector allows a pressurized source of fuel to be accurate released into the combustion chamber.

The injectors (and fuel delivery system) may be provided with a means to return excess fuel back to the storage tank or tanks. Excess fuel may be generated from leaks within the injector. In this case the composition (that is the proportion of gas to ignition initiator and/or other additive(s)) of the fuel in the tank or tanks may change. The engine control unit (ecu) may then adjust the mix of the fuel to compensate for a change in the fuel mixture which is stored in the tank(s). The ecu may be provided with sensors arranged to determine the composition of the fuel in the tank(s) which can be used to adjust the mix accordingly for injection into the engine. For example, the ecu may reduce the amount of ignition improver added to the gas as the proportion of ignition improver increases in the tank(s) being supplied to the injector It will be appreciated that the present invention can be applied to any system where a conventional diesel-cycle engine has been employed such as, for example, in trucks, cars, marine applications or the like. The invention could also be used in static applications of internal combustion engines such as generators or combined heat and power plants (CHPs), where high levels of fuel economy can be achieved using the liquefied or compressed gas fuel disclosed herein.

In the embodiments described above, unless specifically stated otherwise, the fuel may be stored in tanks in the gaseous or liquid phase. In the case where the gas is LPG the gas is preferably stored in a liquid phase thus reducing the volume of the tanks required. In the case where the gas contains a large proportion of methane, such as natural gas, the gas is typically stored in a gaseous phase and may be supercritical. Appropriate storage vessels are provided in each case.

The invention claimed is:

1. A compression ignition engine arranged to operate using a mixture of a fuel gas and an ignition initiator, the engine comprising: a fuel delivery system that receives the fuel gas from a first tank in a liquefied or pressurised state and receives the ignition initiator from a second tank separate from the first tank, and in which the gas and ignition initiator are received separately and then mixed to produce a liquefied or pressurised mixture; the engine further comprising an injector for receiving the mixture and injecting it into a combustion chamber of the engine.

2. A compression ignition engine as claimed in claim 1, wherein the fuel gas comprises a methane based gas.

3. A compression ignition engine as claimed in claim 2, wherein the methane based gas comprises natural gas.

4. A compression ignition engine as claimed in claim 1, wherein the engine is a diesel-cycle engine.

5. A compression ignition engine as claimed in claim 1 wherein the ignition initiator comprises diesel fuel.

6. A compression ignition engine as claimed in claim 1, wherein the fuel gas comprises propane or LPG.

7. A fuel delivery system as claimed in claim 1, wherein the fuel gas is a pressurised fuel gas, the mixture is a pressurised mixture, and the pressurised mixture has a pressure of at least 500 bar.

8. A method of operating a compression ignition engine using a gas based fuel wherein a liquefied or pressurised fuel gas from a first tank is mixed with an ignition initiator from a second tank separate from the first tank in a fuel delivery system of the engine in order to produce a liquefied or pressurised mixture, the mixture is then supplied to an injector, and the injector injects the mixture into the combustion chamber of a compression ignition engine.

9. A method as claimed in claim 8, wherein the fuel gas comprises a methane based gas.

10. A method of operating a compression ignition engine as claimed in claim 9, wherein the methane based gas is natural gas.

11. A method as claimed in claim 8, wherein the ignition initiator comprises diesel fuel.

12. A method as claimed in claim 8, wherein the gas and ignition initiator are mixed in a common rail fuel delivery system.

13. A method as claimed in claim 8, wherein the fuel gas comprises propane or LPG.

14. A fuel delivery system as claimed in claim 8, wherein the fuel gas is a pressurised fuel gas, the mixture is a pressurised mixture, and the pressurised mixture has a pressure of at least 500 bar.

15. A fuel injector assembly comprising a fuel injector and a separate fuel mixing unit, wherein the mixing unit receives a first fuel component from a first tank in the form of a liquefied or pressurised gas and a second fuel component from a second tank separate from the first tank in the form of an ignition initiator and wherein the mixing unit mixes the first and second fuel components to produce a liquefied or pressurized mixture and then supplies the mixed fuel to the injector.

16. A fuel injector assembly as claimed in claim 15, wherein the injector is a hydraulically activated injector.

17. A fuel injector assembly as claimed in claim 15 used in combination with a compression ignition engine.

18. A fuel injector assembly as claimed in claim 15, wherein the first fuel component comprises a methane based gas.

19. A fuel injector assembly as claimed in claim 18, wherein the methane based gas comprises natural gas.

20. A fuel injector assembly as claimed in claim 15, wherein the first fuel component comprises propane or LPG.

21. A fuel delivery system as claimed in claim 15, wherein the fuel gas is a pressurised fuel gas, the mixture is a pressurised mixture, and the pressurised mixture has a pressure of at least 500 bar.

22. A fuel delivery system for a compression ignition engine wherein a mixture of a liquefied or pressurised fuel gas from a first tank and an ignition initiator from a second tank separate from the first tank is supplied to the engine using a common fuel rail and wherein the liquefied or pressurized fuel gas is mixed with the ignition initiator in the common fuel rail to produce a liquefied or pressurised mixture.

23. A fuel delivery system as claimed in claim 22, wherein the fuel gas comprises a methane based gas.

24. A fuel delivery system as claimed in claim 22, wherein the first fuel component comprises propane or LPG.

25. A fuel delivery system as claimed in claim 22, wherein the fuel gas is a pressurised fuel gas, the mixture is a pressurised mixture, and the pressurised mixture has a pressure of at least 500 bar.

* * * * *